Feb. 6, 1940.  F. UNTERBUSCH  2,189,090
HIGH FREQUENCY SIGNALING CABLE
Filed Oct. 26, 1936
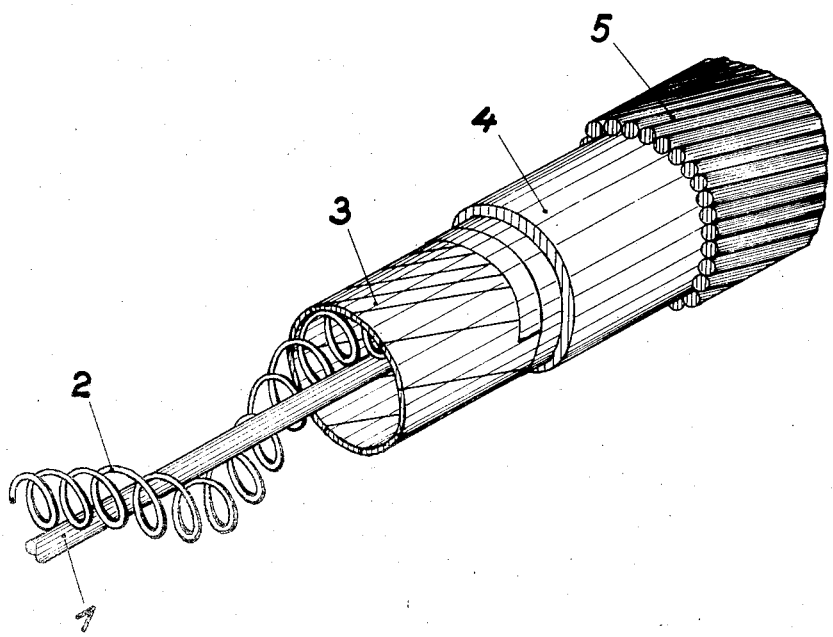
F. Unterbusch
INVENTOR
By Glascock Downing & Leebold
ATTYS Patented Feb. 6, 1940

2,189,090

UNITED STATES PATENT OFFICE 2,189,090

HIGH FREQUENCY SIGNALING CABLE

Franz Unterbusch, Cologne-Mulheim, Germany, assignor to Felten & Guilleaume Carlswerk Actien-Gesellschaft, Cologne-Mulheim, Germany Application October 26, 1936, Serial No. 107,671
In Germany October 30, 1935

1 Claim. (Cl. 174—29)

This invention relates to an improved high frequency signaling cable with air-space insulation and concentric return conductor.

In order to render cables provided with helical metal bands, which serve as a support for the lead sheathing or as a return conductor in a concentric cable, free of torsion, the armouring over the metal bands, which consists of a metal wire or metal band, is laid on the said helical bands with a direction of lay which is opposite to that of the latter. It has however been found in practice that, in contradistinction to cables which are not provided with a yielding air-space insulation, such as high tension cables, in the case of high frequency cables with concentric arrangement of the conductors and yielding air-space insulation, bending and torsional stresses acting on the cable during the laying cause the metal bands to buckle, the air-space insulation offering room for the buckling of the metal bands.

Thus if the bands of the outer conductor are applied helically to the right, and the armouring wires arranged helically to the left, and the cable is turned to the right, the outer conductor tends to increase its diameter and the armouring to reduce its diameter. In this case the tensions which arise are such that the metal bands of the outer conductor easily buckle.

In order to avoid these disadvantages, according to the invention, the bands, which serve as a supporting member, or as a return conductor in the case of a concentric cable, are wound with a long pitch and the wire or band armouring is provided thereon with the same direction of lay as the said bands. It has been found that the bands of the cables so constructed no longer buckle.

The accompanying drawing illustrates, by way of example, a construction of high frequency cable according to the invention.

The conductor 1 is separated from the concentric return conductor 3 of copper bands, which are wound with a long pitch, by a helix 2 of polystyrol. Over the return conductor there is provided the lead sheathing 4 and the wire armouring 5.

What I claim is:

An electrical high frequency cable wherein the stresses tending to buckle the elements of the cable are avoided comprising, a central metal conductor, a second conductor arranged over and substantially concentric with respect to the first conductor, yieldable insulating means consisting of a flexible spacer element interposed between said conductors providing air space insulation between the conductors which space may be altered during bending of the conductors, said second conductor consisting of a plurality of metal bands helically arranged adjacent each other, a lead sheath covering the second conductor, an outer armouring consisting of a plurality of helically arranged wires, said metal bands and the wires extending along the length of the conductors with the same direction of lay whereby the stresses set up in the metal bands and the wires during bending and twisting are substantially equal and buckling of the bands with respect to the wires is avoided.

FRANZ UNTERBUSCH.